(12) United States Patent
Chakka (10) Patent No.: US 8,676,817 B2
(45) Date of Patent: Mar. 18, 2014

(54) RENDERING SELECTED AND UNSELECTED LISTS OF AN ITEM SET

(75) Inventor: Prathiraj Chakka, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 150 days.

(21) Appl. No.: 12/968,484

(22) Filed: Dec. 15, 2010

(65) Prior Publication Data

US 2012/0158752 A1    Jun. 21, 2012

(51) Int. Cl.
*G06F 7/00* (2006.01)
*G06F 17/30* (2006.01)

(52) U.S. Cl.
USPC ......................................................... 707/752

(58) Field of Classification Search
None
See application file for complete search history.

(56) References Cited

U.S. PATENT DOCUMENTS

2006/0218503 A1    9/2006 Matthews et al.

OTHER PUBLICATIONS

DeJean et al, Revealing the hidden secrets of "hide-when" Sep. 1, 2000, International Business Machines, http://www.ibm.com/developerworks/lotus/library/ls-hidewhen/.*
User's Manual for the Examiners Automated Search Tool (EAST) Jul. 22, 1999, Computer Sciences Corp., ver 1.0, all.*
Java 1.4.2 API release date Jun. 26, 2003, Sun Microsystems/Oracle Inc., all.*
Java 1.4.2 API release date Jun. 26, 2003, Sun Microsystems/Oracle Inc., http://docs.oracle.com/javase/1.4.2/docs/api/javax/accessibility/AccessibleState.html; http://docs.oracle.com/javase/1.4.2/docs/api/java/io/File.html; http://docs.oracle.com/javase/1.4.2/docs/api/javax/swing/JList.html.*
Monolith-0, How do I sort into an index? Feb. 23, 2001, http://www.perlmonks.org/?node_id=60442.*
Basch, A Relevant Tale: How Google Killed Inktomi May 3, 2012, diegobasch.com.*
Green, JDK release dates: Java Glossary date unknown, Canadian Mind Products, http://mindprod.com/jgloss/jdkreleasedates.html.*
Chen, Raymond, "Windows Confidential: Start Me Up?" —Published Date: Jun. 2010 http://technet.microsoft.com/en-us/magazine/ff758667.aspx.
Harris, Jensen, "Recently Used Documents" —Published Date: Aug. 16, 2006 http://blogs.msdn.com/b/jensenh/archive/2006/08/16/702214.aspx.
Shultz, Greg, "Take Full Advantage of Jump Lists in Windows 7 with these Tips" —Published Date: Dec. 2, 2009, http://blogs.techrepublic.com.com/window-on-windows/?p=1853.

(Continued)

*Primary Examiner* — Jason Liao
(74) *Attorney, Agent, or Firm* — Sung Kim; Andrew Sanders; Micky Minhas (57) ABSTRACT

An item set may comprise items respectively having a selection status, such as a selected item and an unselected item. The item set may be presented as a selected list and an unselected list having various properties (e.g., mutual exclusivity, such that an item appears on at most one list; both lists sorted according to a sort order; and the unselected list having an unselected list size limit, with unselected items appearing in the unselected list based on a priority order). In order to render the selected list and the unselected list, an item list may be generated that attaches to respective items a selected marker (indicating that the item appears in the selected list) or a hidden marker (indicating that the item does not appear in either the selected list or the unselected list), where the item list is also sorted according to the sort order.

20 Claims, 7 Drawing Sheets

(56) References Cited

OTHER PUBLICATIONS

Johnsone; Dave, "Pin Files and Folders to the Taskbar in Windows 7" —Published Date: Jul. 7, 2010 http://www.bnet.com/blog/businesstips/pin-files-and-folders-to-the-taskbar-in-windows-Jul. 8077.

"Windows 7 New Features" —Retrieved Date: Sep. 15, 2010 http://www.learningcomputer.com/microsoft-windows/windows7/new-features.html.

"Taskbar" —Retrieved Date: Sep. 15, 2010 http://msdn.microsoft.com/en-us/library/aa511446.aspx.

* cited by examiner

RENDERING SELECTED AND UNSELECTED LISTS OF AN ITEM SET

BACKGROUND

Within the field of computing, many scenarios involve a set of items that may be selected or unselected. For example, a computer may present a file system with various files and folders that have been selected based on known or arbitrary criteria (e.g., files and/or folders matching the criteria of a filter, or that have been selected by the user) or a set of records in a database table matching a particular query. As a particular example, a file system may present a set of objects (e.g., files and folders) having various properties, including a name and a modification date. A computer may present to the user a set of recently modified objects, and this list may be limited to a particular size (e.g., no more than ten recently modified items displayed in the list). A user may select one or more recently modified items that are of interest, and may ask the computer to select or "pin" the items with respect to a selected list (e.g., a list of items with which the user is currently working). The computer may therefore present a first list (a "selected list") comprising the selected items, and a second list (a "unselected list") comprising the unselected items. Moreover, these lists may appear to be mutually exclusive. When the user selects an item in the unselected list, the item appears in the selected list and disappears from the unselected list.

These selected items may be presented in various ways. For example, the selected items may be presented as a separate list, e.g., as a selected list comprising the items of the item set that are selected, and an unselected list comprising the items of the item set that are unselected. These different lists may be presented consecutively and/or concurrently, and the items presented in a list may be sorted in various ways (e.g., by alphabetic order, by item type, or by date of creation or modification). Additionally, a user may be permitted to perform various operations on the items, such as selecting or deselecting items.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The items in an item set, comprising a mixed set of selected items and unselected items, may be presented as two different lists that differentiate the selected and unselected items. However, it may be difficult for a computer to achieve this presentation of items in a scalable and performant manner. For example, the items of the item set may be separated into two data structures based on the selected or unselected status of each item, and the computer may separately manage the data structures and render a list from each set. However, it may be advantageous to keep the items together as a single set, e.g., in order to promote operations on the items as a single set (e.g., iterative operations applied to all items of the set), to reduce the overhead of maintaining separate sets, and to avoid issues such as failed synchronization (e.g., an item improperly appearing in both lists). For example, removing an item from the first data structure and adding it to the second data structure may involve a resorting of the second data structure to ensure that the added item appears in the correct location.

Additional details applicable to some scenarios may further complicate this presentation. For example, the items of the item set have a sort order (e.g., the order in which the items are to appear in a list, such as ascending or descending alphabetic or numerical order, item type order, or date of creation). The items also have a priority order that indicates which items appear in the unselected list; e.g., if the items in the unselected list were sorted according to a priority order, a particular subset of items having the highest priority order are included in the unselected list, while the remaining items do not appear in either the selected list or the unselected list. As one such scenario, the items included in the unselected list may comprise recently modified objects (e.g., folders and files) in a file system. A user may be permitted to select or "pin" an item to a "pinned items" list, and a "pinned" item may be removed from the list of recently modified objects. Additionally, the recently modified objects list may be sorted according to the modification date (in descending order), and the list may be limited to a particular number of items, such as the eight most recently edited objects. Both lists may also be visually sorted in a particular manner (e.g., in ascending alphabetic order).

Presented herein are techniques for presenting the items of an item set in a selected list and an unselected list without generating separate data structures for the different items. In accordance with these techniques, the selected and unselected items of the item set may be stored together as a single list, with markers may be attached to respective items to differentiate the items for rendering. For example, the item set may be examined to identify the selected items, and may attach a "selected" marker thereto. The item set may also be examined to identify the unselected items; may sort the items according to the priority order; and, to the items having a low priority order (e.g., all but the three items in the item set having the highest priority, if the unselected list is limited to three items), may attach a "hidden" marker thereto. The items having been so marked may be stored together in an item list, which may be sorted according to the sort order (e.g., ascending alphabetic order). This item list may therefore be used to render both the selected list, e.g., by iterating down the list and rendering (in order) the items having a "selected" marker, and the unselected list, e.g., by iterating down the list and rendering (in order) the items having neither a "selected" marker nor an "unselected" marker. Additionally, items may be moved between the lists simply by updating the markers attached thereto (e.g., moving an item from the unselected list to the selected list by attaching a "selected" marker).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a presentation of an item set comprising a set of items where a subset of the items may be selected (e.g., automatically or by a user). As a first example, a computer may present a file system as a set of objects (e.g., files and folders), and a user may be permitted to select particular objects to which an operation within the file system is to be applied, such as deleting or relocating the objects. As a second example, a computer may present a database table comprising a set of records, where a subset of records may match selected according to a query specifying one or more criteria. In such scenarios, the computer may render (e.g., visually represent) the selection of items within the item set in various ways. As one such example, the selected items and unselected items may be rendered as separate lists, e.g., a selected list and an unselected list. These lists may be mutually exclusive; e.g., an item appearing in the selected list does not appear in the unselected list, and vice versa. Additionally, the user may be permitted to move items; e.g., when an item selects an item in the unselected list, the item may be removed from the unselected list and added to the selected list, and vice versa.

Additional properties of the selected list and the unselected list may further complicate such scenarios. As a first example, each list may be presented with various properties, such as sorting according to a sort order (e.g., an ascending or descending alphabetic, numeric, date, item type, or creation date sort order). These properties may be maintained while performing various operations (e.g., a sort order for each list is to be maintained upon moving an item from one list to the other list). As a second example, the number of items appearing in the selected list and/or the unselected list may be limited (e.g., according to a list size limit) in order to avoid rendering a list comprising many items. Additionally, if the set of items that may appear in the list exceeds the list size limit, a selection process may be applied to specify which items appear in the list according to a priority order. For example, if ten items that qualify for a list having a list size limit of five items, the ten items may be sorted according to a particular criterion (e.g., size, alphabetic order, or modification date), and the five items having the highest priority order may appear in the list, while the other items do not appear in the list.

Figure 1:
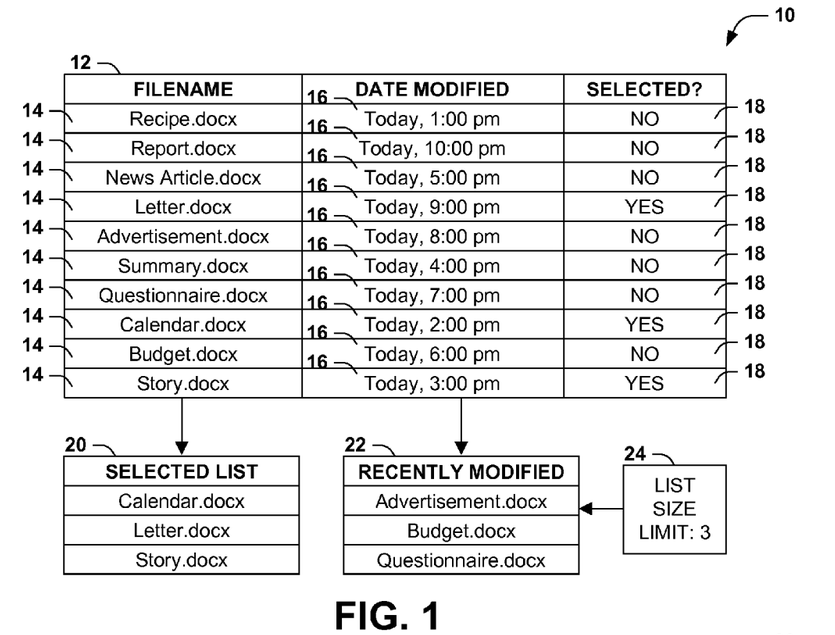
FIG. 1 is an illustration of an exemplary scenario featuring an item set rendered as a selected list and an unselected list.

FIG. 1 presents an exemplary scenario 10 featuring a presentation of an item set 12 comprising items 14 having a selection status 18, in addition to various other properties (e.g., a name whereby the items 14 may be alphabetically sorted, and a modification date when the item was last modified). A computer storing these items 14 may be configured to render the item set 12 as two lists: a selected list 20 comprising the items 14 having a positive selection status 18, and an unselected list 22 comprising the items 14 that do not appear in the selected list 20. The items 14 of both the selected list 20 and the unselected list 22 are sorted by name in ascending alphabetic order. Additionally, the unselected list 22 is limited by an unselected list size limit 24. For example, while the item set 12 in this exemplary scenario 10 includes seven items 14 that are unselected, the unselected list 22 is limited to a maximum size of three items 14. In order to select the items 14 to be included in the unselected list 22, a priority order may be applied to such items 14, e.g., by including only the three items that have been most recently modified. In this manner, the exemplary scenario 10 of FIG. 1 presents the item set 12 as a selected list 20 and an unselected list 22 according to the sort order (e.g., alphabetic sort) and the priority order (e.g., descending order of modification date).

Figure 2:
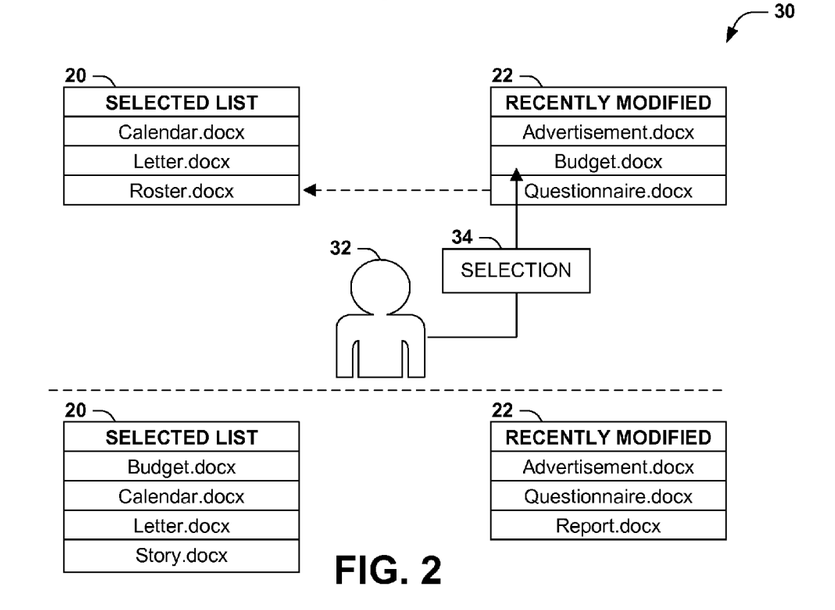
FIG. 2 is an illustration of an exemplary scenario featuring a selection by a user of an item from an unselected list.

As further illustrated in the exemplary scenario 10 of FIG. 1, the selected list 20 and the unselected list 22 are mutually exclusive; e.g., an item 14 appearing in the selected list 20 does not appear in the unselected list 22, and vice versa. However, this mutual exclusivity is somewhat complicated by the priority ordering of the unselected list 22. FIG. 2 illustrates an exemplary scenario 30 involving a selected list 20 and an unselected list 22 populated by items 14, where the unselected list 22 is limited by an unselected size limit 24 of three items 14, which are selected according to a priority order. When a user 32 creates a selection 34 of an item 14 presented in the unselected list 22 (e.g., the "Budget.docx" item), the item 14 may be removed from the unselected list 22 and added to the selected list 20. However, the unselected list 22 now includes fewer items 14 than the unselected list size limit 24, so an item 14 having a high priority order (among the items 14 that are not already included in the selected list 20 or the unselected list 22) may be identified and added to the unselected list 22. Therefore, and as illustrated in FIG. 2, the resulting selected list 20 includes the item 14 targeted by the selection 34 of the user 32, and the unselected list 22 is supplemented with an item 14 having a high priority order among the remaining unselected items 14 (e.g., the "Report.docx" item having a most recent modification date among the items 14 not yet included in either the selected list 20 or the unselected list 22). Additionally, while moving the item 14 to the selected list 20 and while adding an item 14 to the unselected list 22, the computer may preserve the sort order of each list. While FIGS. 1-2 illustrate a specialized scenario, the techniques presented herein may be applied to many scenarios involving item sets 12, items 14, and lists having these properties.

However, it may be difficult to configure a computer to render the selected list 20 and the unselected list 22 with these features in a scalable and performant manner. For example, some implementations may create separate data structures for the selected items 14 and the unselected items, and may render the selected list 20 and the unselected list 22 by referring to the respective data structure, but this implementation may present particular disadvantages. As a first example, the storage of items 14 in separate data structures adds overhead to the implementation. As a second example, each data structure is separately sorted according to the sort order, and when an item 14 is inserted into a data structure, the data structure may have to be resorted in order to maintain the sort order. As a third example, the storage of items 14 in separate data structures may preclude iterative processes to be applied to all items 14 of the item set 12, particularly where such iterative processes are to be performed according to the sort order. As a fourth example, the storage of items 14 in separate data structures may raise an undesirable possibility of desynchronization, e.g., where a logical error causes an item 14 to appear in both the selected list 20 and the unselected list 22. These and other disadvantages may result from the storage of the items 14 in separate data structures in order to achieve the differential rendering of the items 14 in a selected list 20 and an unselected list 22.

Presented herein are techniques for rendering the items 14 of an item set 12 as a selected list 20 and an unselected list 22, respecting various properties of the scenarios described herein (e.g., the items 14 appearing in at most one list; both lists sorted according to a sort order; and the unselected list 22 having an unselected list size limit 24, with the unselected items 14 appearing in the unselected list 22 according to a priority order), without storing the items 14 in separate data structures. In accordance with these techniques, the items 14 of the item set 12 may be stored in a single data structure (an "item list") that is sorted according to the sort order, with various markers attached to the items 14 to indicate inclusion in either the selected list 20 or the unselected list 22. This result may be achieved in the following manner. To the items 14 that are selected, a "selected" marker may be attached. The unselected items 14 may be sorted according to the priority order, and for all but the unselected items 14 having the highest priority (e.g., those having the most recently modification dates) and not exceeding the unselected list size limit 24, a "hidden" marker may be attached, indicating that, although the item 14 is unselected, it does not appear in the unselected list 22. The selected items 14 and the unselected items 14 may then be merged and sorted according to the sort order (e.g., in ascending alphabetic order) in order to generate the item list. This item list may then be utilized to render the selected list 20 and the unselected list 22 in an efficient manner. For example, the selected list 20 may be rendered, in accordance with the sort order, by iterating through the item list and rendering (in order) the items 14 having a selected marker. The unselected list 22 may be rendered, in accordance with the sort order, by iterating through the item list and rendering (in order) the items 14 having neither a selected marker nor a hidden marker.

Figure 3:
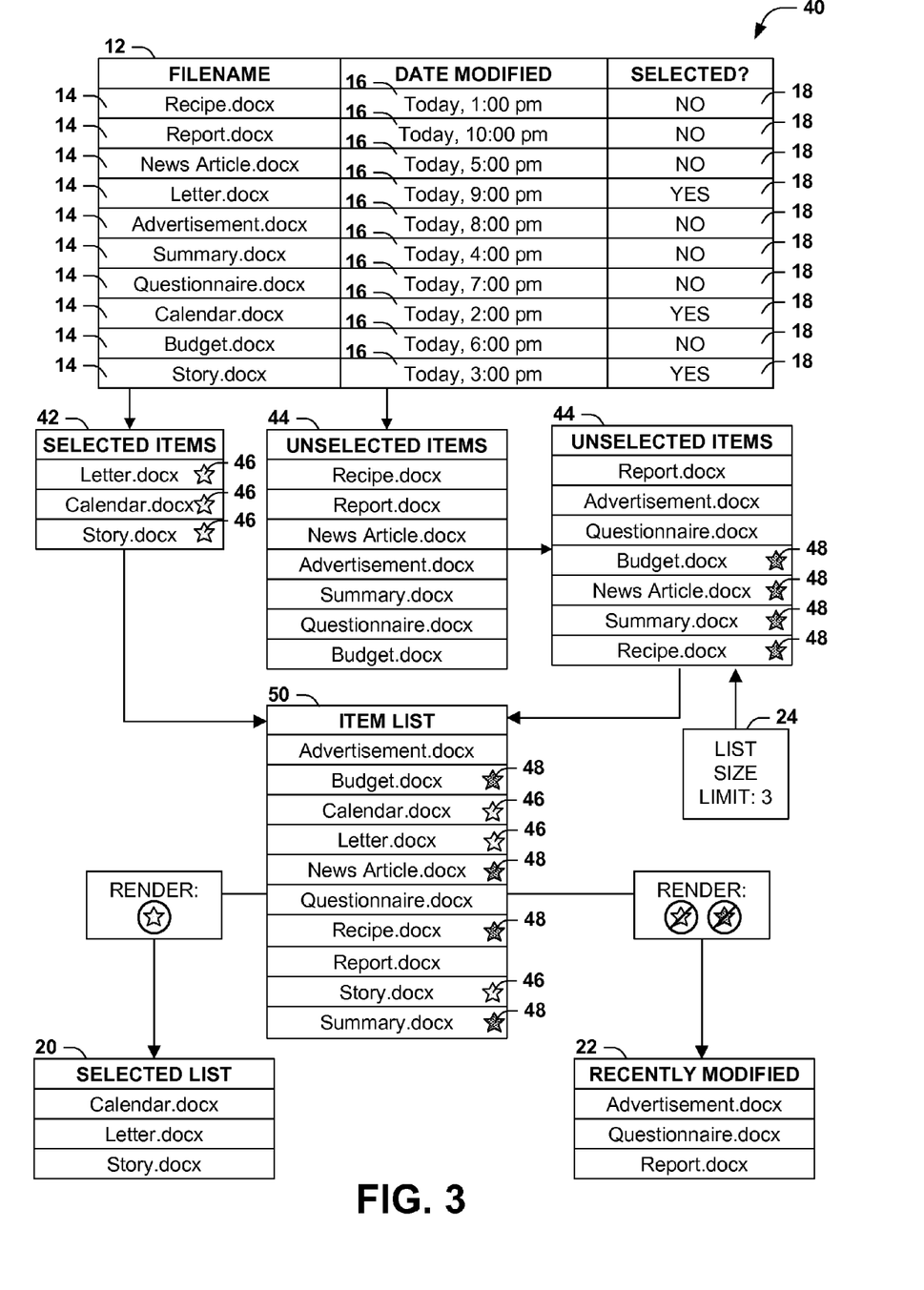
FIG. 3 is an illustration of an exemplary scenario featuring an item set rendered as a selected list and an unselected list according to the techniques presented herein.

FIG. 3 presents an illustration of an exemplary scenario 40 involving the rendering, from an item set 12 comprising various items 14, of a selected list 20 and an unselected list 22 in accordance with the techniques presented herein. In this exemplary scenario 40, three selected items 42 are to be included in the selected list 20; and among unselected items 44 comprising the remainder of the item set 12, only three unselected items 44 are to appear in the unselected list 22 (according to an unselected list size limit 24), and the unselected items 44 are to be selected based on a priority order defined by the modification dates of the items 14. Moreover, the selected list 20 and the unselected list 22 are mutually exclusive (e.g., an item 14 appearing in one list may not appear in the other list), and both lists are sorted according to a sort order (e.g., an alphabetic order according to the names of the items 14). In this exemplary scenario 40, an embodiment of these techniques achieves this rendering in the following manner. First, to the selected items 42 of the item set 12, a selected marker 46 is attached (illustrated in this and other figures as a white star). Second, for the unselected items 44 of the item set 12, the embodiment may identify a priority order among the unselected items 44 (e.g., by sorting the unselected items 44 in descending order of modification date). To the unselected item 44 having a low priority order and exceeding the unselected list size limit 24 (e.g., all but the top three unselected items 44), a hidden marker 48 may be attached (illustrated in this and other figures as a shaded star). The items 14 of the item set 12 may then be merged into an item list 60 (e.g., not a visually rendered list, but a data structure such as an array or linked list), and the item list 60 may be sorted according to a sort order (e.g., sorting the items 14 by name according to ascending alphabetic order). This item list 60 may be utilized to render both the selected list 20 and the unselected list 22. The selected list 20 may be rendered by iterating down the item list 60 and rendering, in order, the items 14 to which a selected marker 46 is attached. The unselected list 22 may be rendered by iterating down the item list 60 and rendering, in order, the items 14 to which neither a selected marker 46 nor a hidden marker 48 is attached. In this manner, an embodiment operating in the exemplary scenario 40 may utilize a single item list 60 to achieve the rendering of the selected list 20 and the unselected list 22.

As compared with other implementations, the implementation illustrated by the exemplary scenario 40 of FIG. 3 may present some advantages. As a first example, the items 14 are stored together in the item list 60, which may permit iterative operations to be applied to all items 14 of the item set 12, and which may preclude the possibility of a list desynchronization, e.g., where an item 14 appears in both lists. The use of one data structure may also promote the efficiency and scalability of the embodiment, e.g., by avoiding the overhead involved in storing and managing multiple data structures. As a second example, the selection status 18 of an item 14 may be reflected by altering the markers attached to the item 14, without having to move the item 14 from a first data structure to a second data structure. Additionally, such modification does not disrupt the sort order embodied by the item list 60; e.g., the item list 60 does not have to be resorted upon moving an item 14 from one list to the other list. These and other advantages may be achieved according to the techniques presented herein.

Figure 4:
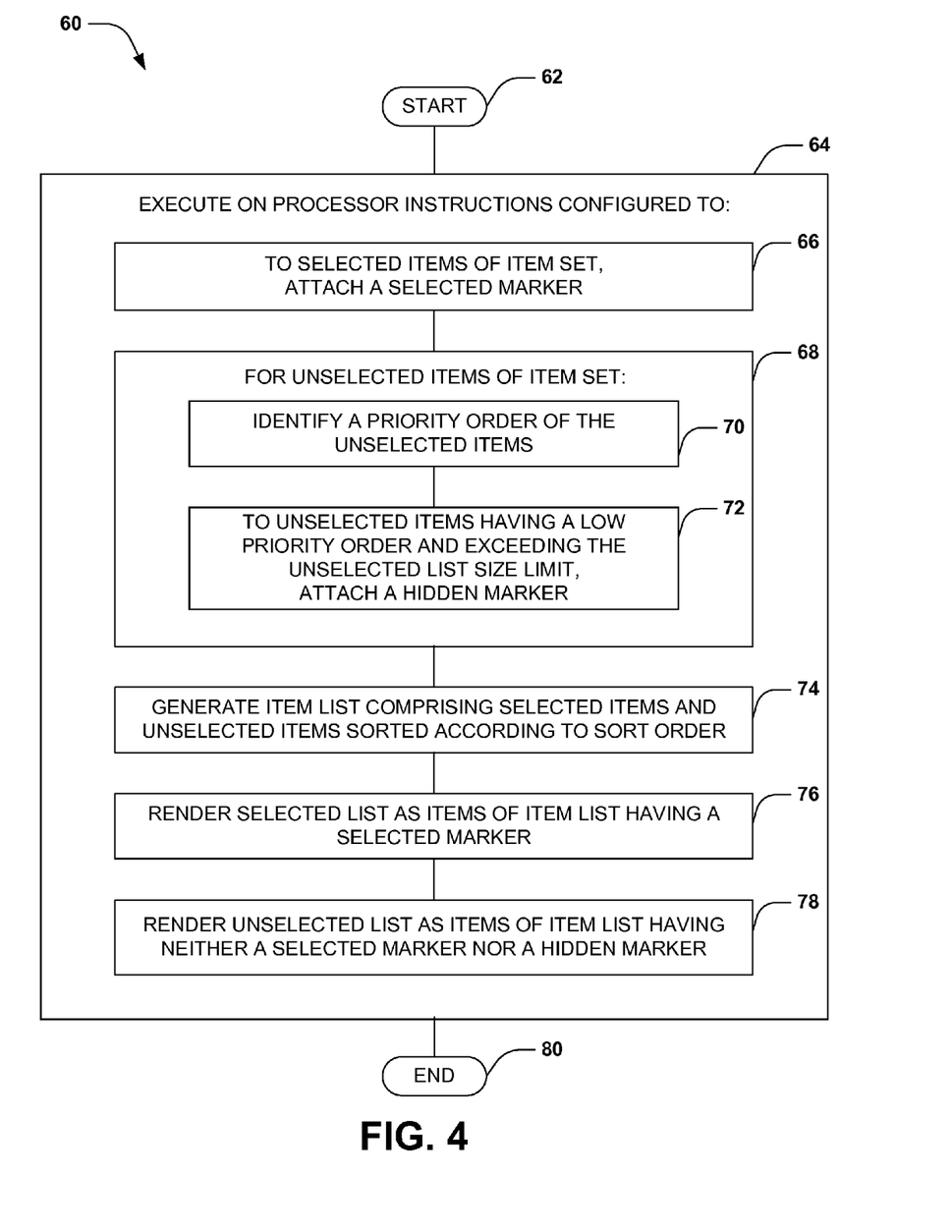
FIG. 4 is a flow chart illustrating an exemplary method of rendering items of an item set as a selected list and an unselected list.

FIG. 4 presents a first embodiment of these techniques, illustrated as an exemplary method 60 configured to rendering items 14 of an item set 12 as a selected list 20 and an unselected list 22. The exemplary method 60 may be implemented, e.g., as a set of software instructions stored in a memory component (e.g., a system memory circuit, a platter of a hard disk drive, a solid state storage device, or a magnetic or optical disc) of the computer 12, that, when executed by the processor of the computer 12, cause the processor to perform the techniques presented herein. The exemplary method 60 begins at 62 and involves executing 64 the instructions on the processor. More specifically, the instructions are configured to, to selected items 42 of the item set 12, attach 66 a selected marker 46. The instructions are also configured to, for unselected items 68 of the item set 12, identify 70 a priority order of the unselected items 44, and to the unselected items 44 having a low priority order and exceeding the unselected list size limit 24, and attach 72 a hidden marker 48. The instructions are also configured to generate 74 an item list 50 comprising the selected items 42 and the unselected items 44 sorted according to the sort order. The instructions are also configured to render 76 the selected list 20 as the items 14 of the item list 50 having a selected marker 46; and render 78 the unselected list 22 as the items 14 of the item list 50 having neither a selected marker 46 nor a hidden marker 48. In this manner, the exemplary method 60 achieves the rendering of the item set 12 as a selected list 20 and an unselected list 22 using the item list 50 generated in accordance with the techniques presented herein, and so ends at 80.

Figure 5:
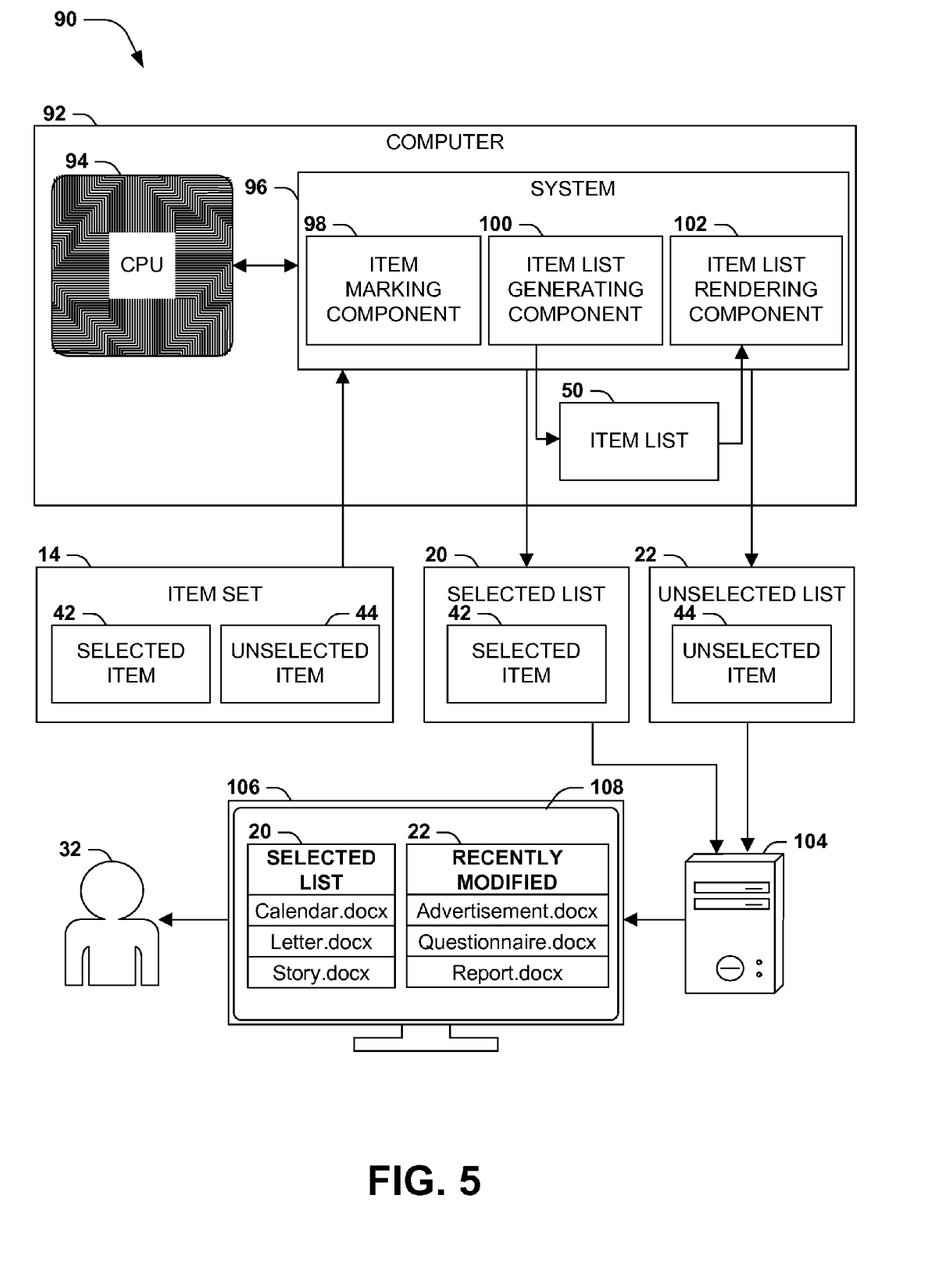
FIG. 5 is a component block diagram illustrating an exemplary system for rendering items of an item set as a selected list and an unselected list.

FIG. 5 presents a second embodiment of these techniques, illustrated as an exemplary system 96 configured to render the items 14 of an item set 12 as a selected list 20 and an unselected list 22 in accordance with a sort order and a priority order by utilizing the techniques presented herein. The exemplary system 96 may operate within a computer 92 having a processor 94, and be implemented, e.g., as a software architecture, comprising a set of components, each comprising a set of software instructions stored in a memory component (e.g., a system memory circuit, a platter of a hard disk drive, a solid state storage device, or a magnetic or optical disc) of the computer 92, that, when executed (concurrently or consecutively) by the processor 94 of the computer 92, cause the processor 94 to perform one or more tasks of the techniques presented herein. The exemplary system 96 includes an item marking component 98, which is configured to, to selected items 42 of the item set 12, attach a selected marker 46. The item marking component 98 is also configured to, for unselected items 44 of the item set 12, identify a priority order of the unselected items 44, and to the unselected items 44 having a low priority order and exceeding the unselected list size limit 24 of the unselected list 22, attach a hidden marker 48. The exemplary system 96 also includes an item list generating component 100, which is configured to generate an item list 50 comprising the selected items 20 and the unselected items 22 sorted according to the sort order. The exemplary system 96 also includes an item list rendering component 102, which is configured to render the selected list 20 as the items 14 of the item list 50 having a selected marker 46, and render the unselected list 22 as the items 14 of the item list 50 having neither a selected marker 46 nor a hidden marker 48. In this manner, the exemplary system 96 causes the processor 94 of the computer 92 to render the items 14 of the item set 12 as a selected list 20 and an unselected list 22, respecting the sort order and the priority order of the items 14 and the unselected list size limit 24 of the unselected list 22, by utilizing the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
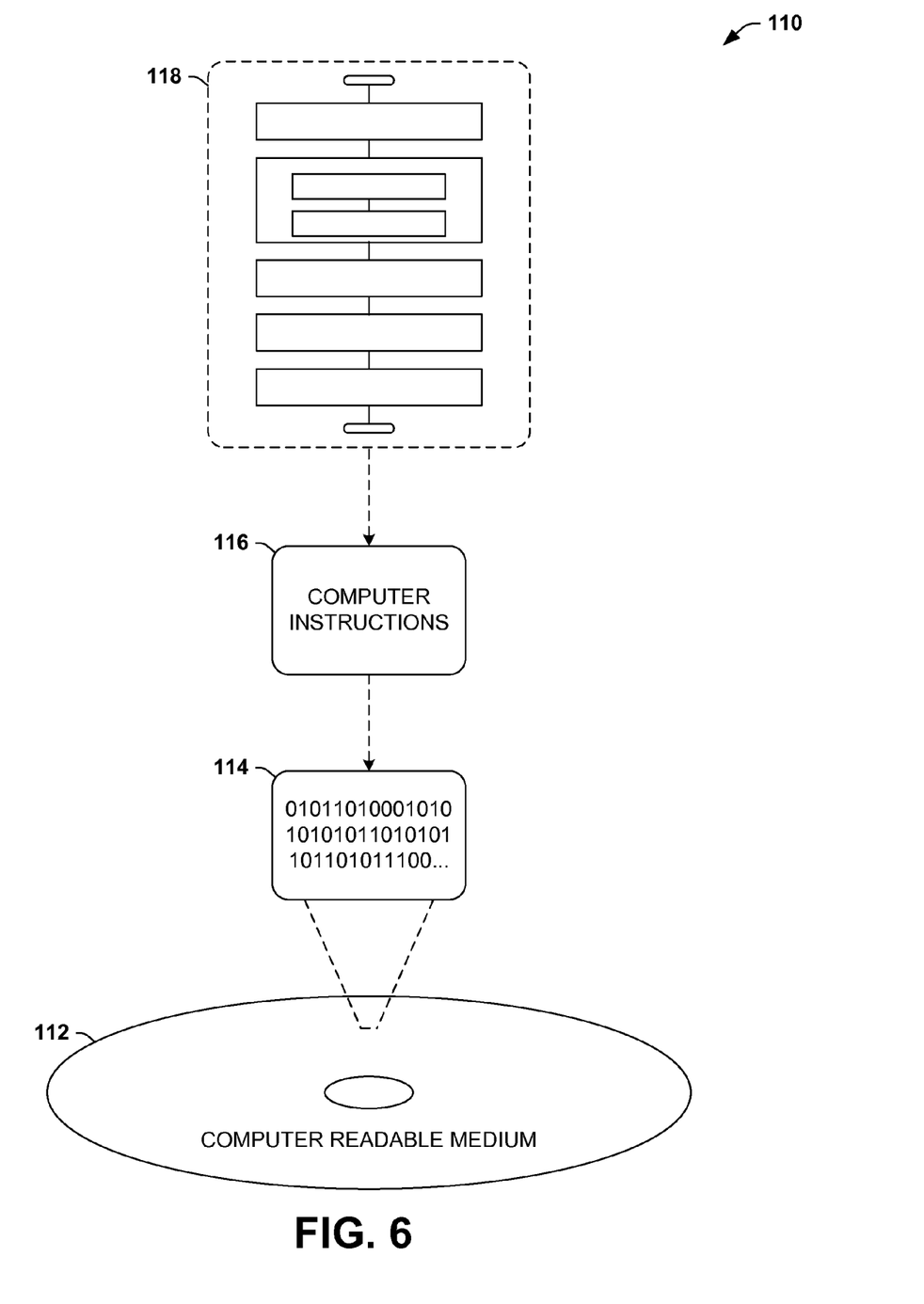
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to operate according to the principles set forth herein. In one such embodiment, the processor-executable instructions 116 may be configured to perform a method 118 of rendering items of an item set as a selected list and an unselected list, such as the exemplary method 60 of FIG. 4. In another such embodiment, the processor-executable instructions 116 may be configured to implement a system for rendering items of an item set as a selected list and an unselected list, such as the exemplary system 96 of FIG. 5. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 4 and the exemplary system 96 of FIG. 5) to confer individual and/or synergistic advantages upon such embodiments.

A first aspect that may vary among embodiments of these techniques relates to the scenarios wherein such techniques may be utilized. The techniques presented herein may be particularly useful for the scenario utilized in the figures (e.g., presenting folders and files of a file system as a set of pinned items comprising a pinned items list and a set of unpinned items comprising an modified items list including the unpinned items sorted according to an item modification date, sorting the items 14 of both lists in ascending alphabetic order, and including unselected items 44 in the unselected list 22 according to a priority order based on the item modification dates). However, these techniques may be applicable to many other scenarios. As a first variation of this first aspect, these techniques may be utilized to render many types of item sets 12 comprising many types of items 14, such as files and folders in a file system; records in a database table; rows, columns, or cells in a spreadsheet; objects in an object system; or email messages in a mailbox. As a second variation of this first aspect, the selection of items 14 in the item set 12 may be performed automatically and/or by a user 32, and may represent many types of semantics (e.g., items 14 matching the criteria of a query or filter; items 14 involved in an operation, such as a move or delete operation of a file system; or items 14 arbitrarily selected by a user 32). As a third variation of this first aspect, the selected lists 20 and unselected lists 22 generated from the item list 50 may be rendered in various ways. As a first such example, a computer 92 featuring an embodiment of these techniques may include a display component, which may be configured to display the item set 12 to a user 32, and the embodiment may render the selected list 20 and the unselected list 22 on the display component. As a second such example, the selected list 20 and the unselected list 22 may be stored on a storage device of the computer 92. As a third such example, the selected list 20 and the unselected list 22 may be electronically transmitted to another computer 92 and/or user 32. Those of ordinary skill in the art may devise many scenarios wherein the techniques presented herein may be utilized.

A second aspect that may vary among embodiments of these techniques relates to the order of the items 14 according to the sort order and/or the priority order. As a first variation of this second aspect, many criteria may be utilized as a sort order and/or a priority order of the items 14, such as an ascending or descending alphabetic sort order, numeric sort order, or date sort order based on one or more data and/or metadata associated with the items 14; an item type order (e.g., sorting items of a first item type before items of a second item type); an item owner order (e.g., sorting items owned by a first owner before items owned by a second owner); and an item location order (e.g., sorting items located in a first location before items located in a second location). For example, in the exemplary scenario 40 of FIG. 3, the item set 12 may represent the objects of a file system, including various files and folders. It may be advantageous to, within the selected list 20 and/or the unselected list 22, present items comprising folders before items comprising files, while otherwise maintaining the alphabetic order of the items 14. Therefore, an embodiment of these techniques may, while sorting the items 14 in the item set 50, apply a first sort order based on the item type (sorting folders before files), and then apply a second sort order based on the ascending alphabetic order of the names of the items 14 within each item type.

As a second of this second variation, an embodiment may allow a user 32 to select the sort order and/or the priority order of the item list 50 from a sort order set and/or a priority order set. As a first such example, a rendering of the selected list 20 and/or the unselected list 22 may include a control (such as a combo box) including a sort order set. Upon receiving from the user 32 a selected sort order, the embodiment may sort the item list 50 according to the selected sort order, and re-render the selected list 20 and the unselected list 22. As a second such example, a rendering of the unselected list 22 may include a control including a priority order set. Upon receiving from the user 32 a selected priority order, the embodiment may re-render the unselected list 22 using the selected priority order. As a third such example, the user 32 may be permitted to specify an unselected list size limit 24, and an embodiment may be configured to, upon receiving from the user 32 a selection of an unselected list size limit 24, re-render the unselected list using the unselected list size limit 24. Those of ordinary skill in the art may devise many ways of sorting and/or prioritizing the items 14 of the item list 50 in accordance with the techniques presented herein.

A third aspect that may vary among embodiments of these techniques relates to the selection and deselection of items 14 after generating the item list 50. In some scenarios, the selected list 20 and the unselected list 22 may not permit changes to the selection statuses 18 of the items 14. However, in other scenarios, after the items 14 are presented to a user 32, the user 32 may select or deselect items 14, and an embodiment of these techniques may have to adjust the item list 50, the selected list 20, and/or the unselected list 22 to reflect these changes. Moreover, such adjustments may have to be performed in order to maintain the features of the rendering (e.g., the mutual exclusivity of the selected list 20 and the unselected list 22; the sort order of the selected list 20 and the unselected list 22; and the restriction of the unselected list 22 according to the unselected list size limit 24, with unselected items 44 included according to a priority order).

As a first variation of this third aspect, respective unselected items 44 of the unselected list 22 may be rendered with an item selection indicator, e.g., a control that a user 32 may operate to indicate a selection of an unselected item 44. Upon receiving a selection of a first item 14 in the unselected list 22, an embodiment of these techniques may implement the selection by locating the item 14 in the item list 50 and attaching a selected marker 46 to the first item 14. The embodiment may then re-render the selected list 20 and the unselected list 22 (e.g., by erasing a first rendering of the list(s) on a display component and displaying a second rendering thereof, or by adjusting a previous rendering to indicate the change). Additionally, if the size of the unselected list 22 after altering the first item 14 is now below the unselected list size limit 24, an embodiment may be configured to replace the first item 14 in the unselected list 22 with a second item 14. For example, the embodiment may, among the items 14 of the item set 50 having a hidden marker 48 (e.g., the items 14 that are unselected and also not yet included in the unselected list 22), identify a second item 14 having a high priority order, and detach the hidden marker 48 from the second item 14.

Conversely, and as a second variation of this third aspect, respective selected items 42 of the selected list 20 may be rendered with an item deselection indicator, e.g., a control that a user 32 may operate to indicate a deselection of a selected item 42. Upon receiving a deselection of a first item 14 in the selected list 20, an embodiment of these techniques may implement the deselection by locating the item 14 in the item list 50 and detaching the selected marker 46 from the first item 14. The embodiment may then re-render the selected list 20 and the unselected list 22 (e.g., by erasing a first rendering of the list(s) on a display component and displaying a second rendering thereof, or by adjusting a previous rendering to indicate the change). Additionally, if the size of the unselected list 22 after altering the first item 14 exceeds the unselected list size limit 24, an embodiment may be configured to remove an item 14 from the unselected list 22. For example, the embodiment may, among the items 14 of the item set 50 having neither a selected marker 46 nor a hidden marker 48 (e.g., the items 14 that are unselected and included in the unselected list 22), identify a second item 14 having a low priority order, and attach a hidden marker 48 to the second item 14.

These and other variations may involve a comparison the priority order of various items 14 or subsets thereof in the item list 50. However, it may be inefficient for an embodiment of these techniques to perform this comparison in an ad hoc manner, e.g., upon receiving each selection or deselection of items 14 from a user 32. Accordingly, and as a third variation of this third aspect, an embodiment of these techniques may perform the priority order evaluation during the generation of the item set 50, and may encode this information in the item set 50. For example, an embodiment may, while generating the item list 50, identify a priority order of the items 14, and attach a priority order marker to respective items 14 based on the priority order (e.g., an integer identifying the priority order of the item 14 within the item set 12). The embodiment may then utilize these priority order markers while performing comparisons of the items 14 of the item list 50.

Figure 7:
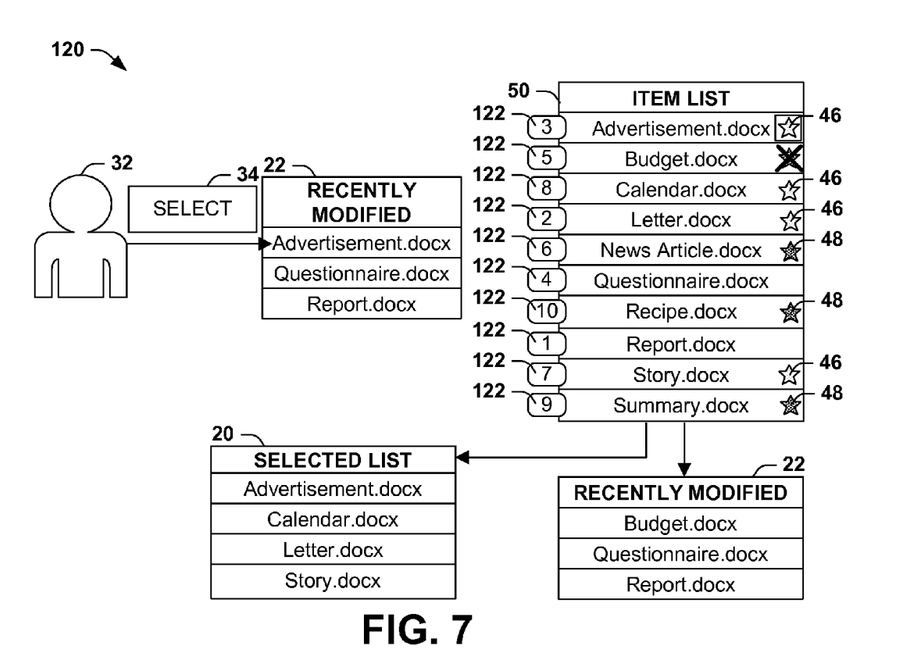
FIG. 7 is an illustration of another exemplary scenario featuring a selection by a user of an item from an unselected list.

FIG. 7 presents an illustration of an exemplary scenario 120 featuring an item list 50 comprising items 14 sorted according to a sort order (e.g., in ascending alphabetic order), and to which selected markers 46 and hidden markers 48 have been attached to indicate inclusion and/or exclusion in a selected list 20 and an unselected list 22. In accordance with this third variation of this third aspect, an embodiment may have also attached to respective items 14 a priority order marker 122 that identifies the priority order of the item 14 within the item set 12. This information may be utilized when a user 32 performs a selection 34 of an unselected item 44 in the unselected list 22 (e.g., a selection of the "Advertisement.docx" item). The embodiment may locate this item 14 in the item list 50 and attach a selected marker 46 to indicate the inclusion of the item 14 in the selected list 20. However, the embodiment also has to replace the item 14 in the unselected list 22 in order to conform to the unselected list size limit 24. Accordingly, the embodiment may compare the priority order markers 122 of the items 14 in the item list 50 having a hidden marker 48, and to the item 14 having the highest priority order marker 122 (e.g., the "Budget.docx" item 14), may remove the hidden marker 48 to include the unselected item 44 in the unselected list 42. The embodiment may then, according to the techniques presented herein, re-render the selected list 20 (now including the "Advertisement.docx" item 14) and the unselected list 22 (now excluding the "Advertisement.docx" item 14, and including the "Budget.docx" item 14). It may be appreciated that, in accordance with the techniques presented herein, the sort order of the selected item 20 and the unselected item 22 are preserved without having to resort either list, and without jeopardizing the synchronization of the lists.

Figure 8:
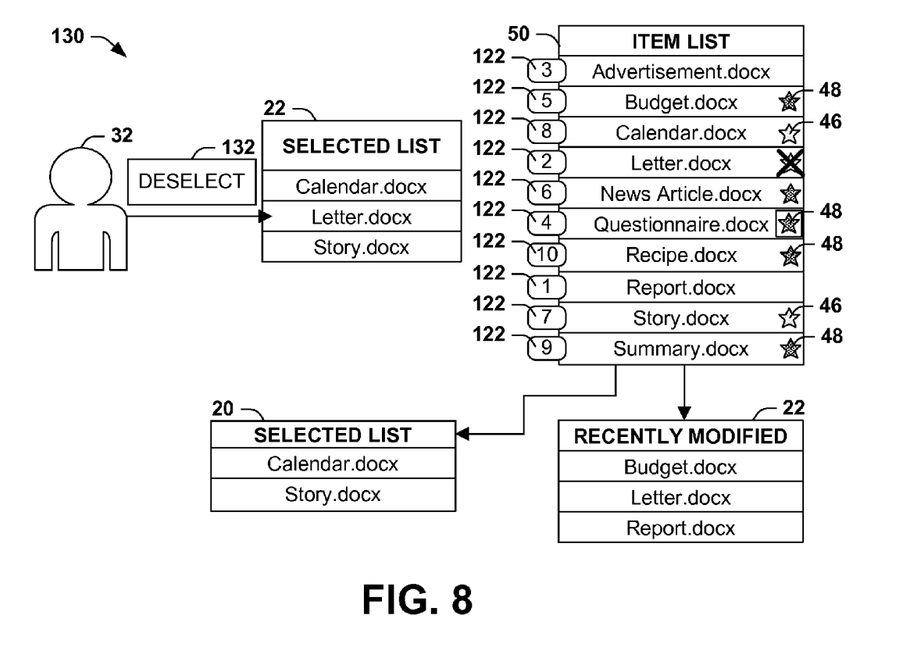
FIG. 8 is an illustration of an exemplary scenario featuring a deselection by a user of an item from a selected list.

FIG. 8 presents an illustration of another exemplary scenario 130 featuring an item list 50 comprising items 14 sorted according to a sort order (e.g., in ascending alphabetic order), and to which selected markers 46 and hidden markers 48 have been attached to indicate inclusion and/or exclusion in a selected list 20 and an unselected list 22. Again, in accordance with this third variation of third aspect, an embodiment may have also attached to respective items 14 a priority order marker 122 that identifies the priority order of the item 14 within the item set 12. However, in this exemplary scenario 130, this information is utilized when the user 32 performs a deselection 132 of a selected item 42 in the selected list 20 (e.g., a deselection of the "Letter.docx" item). The embodiment may locate this item 14 in the item list 50 and detach the selected marker 46 to indicate the removal of the item 14 from the selected list 20. However, the embodiment also has to remove an item 14 from the unselected list 22 in order to conform to the unselected list size limit 24. Accordingly, the embodiment may compare the priority order markers 122 of the items 14 in the item list 50 having neither a selected marker 46 nor a hidden marker 48, and to the item 14 having the lowest priority order marker 122 (e.g., the "Questionnaire.docx" item 14), may attach a hidden marker 48 to remove the unselected item 44 from the unselected list 42. The embodiment may then, according to the techniques presented herein, re-render the selected list 20 (now excluding the "Letter.docx" item 14) and the unselected list 22 (now including the "Letter.docx" item 14 and excluding the "Questionnaire.docx" item 14). Again, it may be appreciated that, in accordance with the techniques presented herein, the sort order of the selected item 20 and the unselected item 22 are preserved without having to resort either list, and without jeopardizing the synchronization of the lists. Those of ordinary skill in the art may devise many ways of implementing the selection or deselection of items 14 in the item list 50 in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
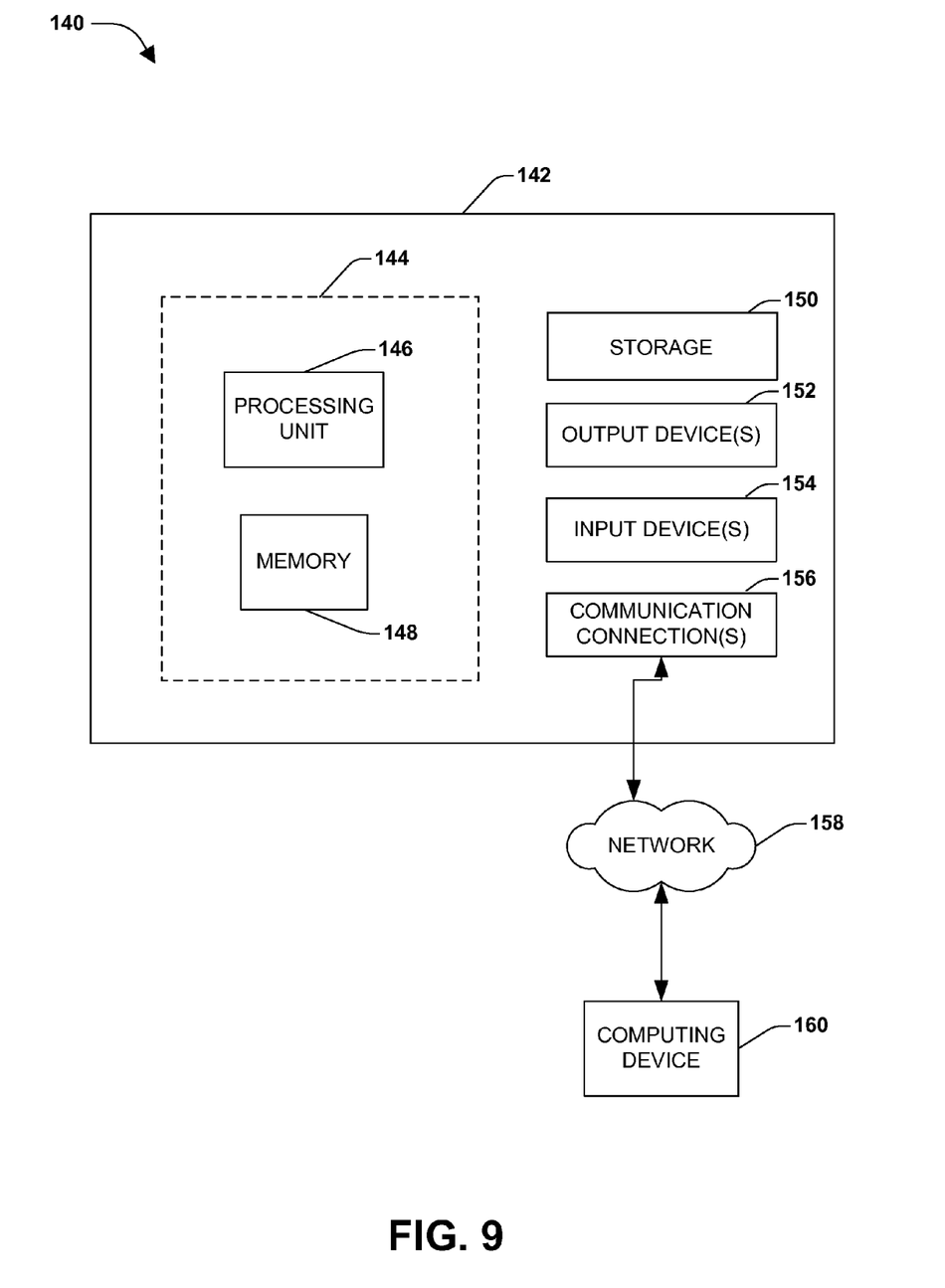
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 9 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 9 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of rendering an item set comprising items having a first sort order and a second sort order that is different from the first sort order as a selected list and an unselected list having an unselected list size limit on a computer having a processor and a display component, the method comprising:
   executing on the processor instructions configured to:
      to selected items of the item set, attach a selected marker;

for unselected items of the item set:
   sort the unselected items according to the second sort order, and
   to the unselected items that, when the unselected items are sorted according to the second sort order, have a priority order index below the unselected list size limit, attach a hidden marker;
  store an item list persisting the selected markers attached to the selected items and the hidden markers attached to the unselected items;
  concurrently present:
   in a first region of the display component, the items of the item list having a selected marker sorted according to the first sort order; and
   in a second region of the display component that is different from the first region, the unselected list as the items of the item list having neither a selected marker nor a hidden marker and sorted according to the first sort order; and
upon receiving a second request to present the selected list and the unselected list:
  retrieve the item list including the selected markers and the hidden markers; and
  concurrently present:
   in a first region of the display component, the items of the item list having a selected marker; and
   in a second region of the display component that is different from the first region, the unselected list as the items of the item list having neither a selected marker nor a hidden marker.

2. The method of claim 1:
the selected items comprising pinned items comprising items selected by a user;
the selected list comprising a pinned items list;
the unselected items further comprising unpinned items comprising items not selected by the user;
the unselected list further comprising a modified items list comprising unpinned items sorted according to an item modification date; and
the priority second sort order ordered according to the item modification dates of the items.

3. The method of claim 1:
rendering the unselected list further comprising: rendering with the items of the unselected list an item selection indicator; and
the instructions further configured to, upon receiving a selection of a first item in the unselected list:
  attach a selected marker to the first item, and
  re-render the selected list and the unselected list.

4. The method of claim 3, the instructions further configured to, upon receiving the selection of the first item:
among the items having a hidden marker, identify a second item having a high second sort order; and
detach the hidden marker from the second item.

5. The method of claim 1:
rendering the selected list further comprising: rendering with the items of the selected list an item deselection indicator; and
the instructions further configured to, upon receiving a deselection of a first item in the selected list:
  detach the selected marker to the first item, and
  re-render the selected list and the unselected list.

6. The method of claim 5, the instructions further configured to, upon receiving the deselection of the first item:
among the items having neither a selected marker nor a hidden marker, identify a second item having a low second sort order; and
attach a hidden marker to the second item.

7. The method of claim 1: the instructions further configured to, before sorting the item list according to the first sort order:
sort the items according to the second sort order, and
attach a priority order marker to respective items based on the second sort order; and
identifying a second sort order of an item comprising:
  identifying the second sort order of the item according to the priority order marker.

8. The method of claim 1, the first sort order selected from a sort order set comprising:
an alphabetic sort order;
a numeric sort order;
a date sort order;
an item type order;
an item owner order; and
an item location order.

9. The method of claim 1, the instructions further configured to:
present to a user a sort order set; and
upon receiving from the user a selected sort order from the sort order set:
  sort the item list according to the selected sort order, and
  re-render the selected list and the unselected list.

10. The method of claim 1:
respective items further comprising an item type, the items of a first item type to be sorted before items of a second item type; and
generating the item list further comprising: generating the item list comprising the selected items and the unselected items sorted first according to the item type and second according to the first sort order.

11. The method of claim 10:
the item set further comprising a file system;
the first item type further comprising a folder; and
the second item type further comprising a file.

12. A system configured to render an item set comprising items having a first sort order and a second sort order that is different from the first sort order as a selected list and an unselected list having an unselected list size limit, the system comprising:
an item marking component configured to:
  to selected items of the item set, attach a selected marker;
  for unselected items of the item set:
   sort the unselected items according to the second sort order, and
   to the unselected items that, when the unselected items are sorted according to the second sort order, have a priority order index below the unselected list size limit, attach a hidden marker;
an item list generating component configured to store an item list persisting the selected markers attached to the selected items and the hidden markers attached to the unselected items sorted; and
an item list rendering component configured to:
  concurrently present:
   in a first region of the display component, the items of the item list having a selected marker sorted according to the first sort order; and
   in a second region of the display component that is different from the first region, the unselected list as the items of the item list having neither a selected marker nor a hidden marker and sorted according to the first sort order; and upon receiving a second request to present the selected list and the unselected list:
retrieve the item list including the selected markers and the hidden markers; and
concurrently present:
in a first region of the display component, the items of the item list having a selected marker; and
in a second region of the display component that is different from the first region, the unselected list as the items of the item list having neither a selected marker nor a hidden marker.

13. The system of claim 12:
the system further comprising: a display component configured to display the item set to a user; and
the item list rendering component further configured to concurrently present:
the selected list in a first region of on the display component; and
the unselected list in a second region of the display component that is different from the first region.

14. The system of claim 12:
the selected items comprising pinned items comprising items selected by a user;
the selected list further comprising a pinned items list;
the unselected items further comprising unpinned items comprising items not selected by the user;
the unselected list further comprising a modified items list comprising the unpinned items sorted according to an item modification date; and
the priority second sort order comprising the item modification dates of the items.

15. The system of claim 12:
the item list rendering component further configured to render with the items of the unselected list an item selection indicator; and
the system further comprising: an item selecting component configured to, upon receiving a selection of a first item in the unselected list:
attach a selected marker to the first item, and
re-render the selected list and the unselected list.

16. The system of claim 15, the item selecting component further configured to, upon receiving the selection of the first item:
among the items having a hidden marker, identify a second item that, when the unselected items are sorted according to the second sort order, has a priority order index above the unselected list size limit; and
detach the hidden marker from the second item.

17. The system of claim 12:
the item list rendering component further configured to present with the items of the selected list an item deselection indicator; and
the system further comprising: an item deselecting component configured to, upon receiving a deselection of a first item in the selected list:
detach the selected marker to the first item, and
re-render the selected list and the unselected list.

18. The system of claim 17, the item deselecting component further configured to, upon receiving the deselection of the first item:
among the items having neither a selected marker nor a hidden marker, identify a second item having a low second sort order; and
attach a hidden marker to the second item.

19. The system of claim 12:
the respective items comprising an item type, the items of a first item type to be presented before items of a second item type; and
the item list generating component further configured to generate the item list comprising the selected items and the unselected items sorted first according to the item type and second according to the first sort order.

20. A nonvolatile computer-readable storage device storing instructions that, when executed on a processor of a device having an item set comprising items having a first sort order and a second sort order that is different from the first sort order, present the item set as a selected list and an unselected list having an unselected list size limit, by:
to selected items of the item set, attaching a selected marker;
for unselected items of the item set:
sort the unselected items according to the second sort order, and
to the unselected items that, when the unselected items are sorted according to the second sort order, have a priority order index below the unselected list size limit, attach a hidden marker;
storing an item list persisting the selected markers attached to the selected items and the hidden markers attached to the unselected items;
concurrently presenting:
in a first region of the display component, the items of the item list having a selected marker sorted according to the first sort order; and
in a second region of the display component that is different from the first region, the unselected list as the items of the item list having neither a selected marker nor a hidden marker and sorted according to the first sort order; and
upon receiving a second request to present the selected list and the unselected list:
retrieving the item list including the selected markers and the hidden markers; and
concurrently presenting:
in a first region of the display component, the items of the item list having a selected marker; and
in a second region of the display component that is different from the first region, the unselected list as the items of the item list having neither a selected marker nor a hidden marker.

\* \* \* \* \*